(12) United States Patent
Ihm et al.

(10) Patent No.: US 7,689,173 B2
(45) Date of Patent: Mar. 30, 2010

(54) METHOD AND SYSTEM FOR CONTROLLING REVERSE LINK RATE IN CDMA 1XEV-DO MOBILE COMMUNICATION SYSTEM

(75) Inventors: Jongtae Ihm, Seongnam-si (KR); Jaemoon Lee, Songpa-gu (KR); Hojin Yang, Siheung-si (KR); Jintae Choi, Dongjak-gu (KR); Sungho Jo, Gangnam-gu (KR); Sangjin Han, Anyang-si (KR)

(73) Assignee: SK Telecom Co., Ltd., Seoul (KR)

( * ) Notice: Subject to any disclaimer, the term of this patent is extended or adjusted under 35 U.S.C. 154(b) by 855 days.

(21) Appl. No.: 10/566,830

(22) PCT Filed: Jul. 30, 2004

(86) PCT No.: PCT/KR2004/001928

§ 371 (c)(1),
(2), (4) Date: Sep. 26, 2006

(87) PCT Pub. No.: WO2005/013513

PCT Pub. Date: Feb. 10, 2005

(65) Prior Publication Data

US 2007/0081509 A1    Apr. 12, 2007

(30) Foreign Application Priority Data

Jul. 31, 2003    (KR) ................ 10-2003-0053226

(51) Int. Cl.
*H04B 17/00* (2006.01)
(52) U.S. Cl. ............. 455/67.11; 455/67.13; 455/522; 370/342
(58) Field of Classification Search ............ None
See application file for complete search history.

(56) References Cited

U.S. PATENT DOCUMENTS 5,859,838 A * 1/1999 Soliman .............. 370/249

(Continued)

FOREIGN PATENT DOCUMENTS

WO    WO-00/33475 A2    6/2000

OTHER PUBLICATIONS

International Search Report Application No. PCT/KR2004/001928, dated Oct. 25, 2004.
Japanese Office Action dated Oct. 30, 2008, for Japanese application No. 2006-521790.

(Continued)

*Primary Examiner*—Seema S Rao
*Assistant Examiner*—Steven Wood
(74) *Attorney, Agent, or Firm*—Lowe Hauptman Ham & Berner, LLP

(57) ABSTRACT

A method and a system for controlling a reverse link rate by using the number of active users who are carrying out communication in a CDMA 1xEV-DO mobile communication system is disclosed. A value of rise-over-thermal (ROT) at each antenna end of a wireless base station is measured and compared with a threshold ROT which defines an allowable limit of the ROT. A reverse activation control bit is set as 0 if the measured ROT value is smaller than or equal to the threshold ROT. The number of the active users is compared with a threshold user number which defines an allowable limit of the active users if the measured ROT value is greater than the threshold ROT. The reverse activation control bit is set as 0 if the number of the active users is smaller than or equal to the threshold user number. The reverse activation control bit is set as 1 if the number of the active users is greater than the threshold user number.

44 Claims, 4 Drawing Sheets

U.S. PATENT DOCUMENTS

| | | | |
|---|---|---|---|
| 6,212,364 B1* | 4/2001 | Park | 455/69 |
| 6,249,515 B1* | 6/2001 | Kim et al. | 370/337 |
| 6,317,435 B1* | 11/2001 | Tiedemann et al. | 370/441 |
| 6,944,147 B2* | 9/2005 | Chheda | 370/342 |
| 7,120,447 B1* | 10/2006 | Chheda et al. | 455/453 |
| 7,200,391 B2* | 4/2007 | Chung et al. | 455/423 |
| 7,411,923 B2* | 8/2008 | Attar et al. | 370/328 |
| 2002/0141349 A1* | 10/2002 | Kim et al. | 370/252 |
| 2002/0186657 A1* | 12/2002 | Jain et al. | 370/235 |
| 2002/0193118 A1* | 12/2002 | Jain et al. | 455/453 |
| 2003/0093364 A1* | 5/2003 | Bae et al. | 705/37 |
| 2003/0119452 A1* | 6/2003 | Kim et al. | 455/69 |
| 2003/0231586 A1* | 12/2003 | Chheda | 370/230 |
| 2004/0014482 A1* | 1/2004 | Kwak et al. | 455/522 |
| 2004/0095960 A1* | 5/2004 | Attar et al. | 370/468 |
| 2004/0110534 A1* | 6/2004 | Chung et al. | 455/561 |
| 2004/0121808 A1* | 6/2004 | Hen et al. | 455/561 |
| 2004/0162101 A1* | 8/2004 | Kim et al. | 455/522 |
| 2004/0177154 A1* | 9/2004 | Sarkkinen et al. | 709/236 |
| 2004/0202136 A1* | 10/2004 | Attar et al. | 370/333 |
| 2004/0213182 A1* | 10/2004 | Huh et al. | 370/332 |
| 2004/0258035 A1* | 12/2004 | Fan et al. | 370/342 |
| 2005/0026624 A1* | 2/2005 | Gandhi et al. | 455/453 |

OTHER PUBLICATIONS

Motorola and Lucent, Node B Controlled Time and Rate Scheduling 3GPP TSG-RAN WG1 #32 meeting, May 19, 2003, R1-03-0592.
Nortel Networks, Reverse Link Adaptive Rate Control for Release D, 3GPP2 TSG-C, May 12, 2003, C30-20030512-051, pp. 1-9.

* cited by examiner

METHOD AND SYSTEM FOR CONTROLLING REVERSE LINK RATE IN CDMA 1XEV-DO MOBILE COMMUNICATION SYSTEM

RELATED APPLICATION

This Application is a 371 U.S. national phase of PCT application number PCT/KR2004/001928, which claims priority to Korean patent application number 2003-53226 filed on Jul. 31, 2003.

TECHNICAL FIELD

The present invention relates to a method and a system for controlling a reverse link rate in a CDMA 1xEV-DO mobile communication system; and, more particularly, to a method and a system for controlling a reverse link rate in the CDMA 1xEV-DO mobile communication system through the steps of measuring a rise-over-thermal (ROT) value of the system, determining a reverse activation control bit by using at least one of the measured ROT value, the number of users who are carrying out communication, and a cell self-interference rate, and transmitting the determined reverse activation control bit to a mobile terminal.

BACKGROUND ART

Mobile communication systems have developed through first-generation analog AMPS (Advanced Mobile Phone Systems) and second-generation cellular/PCS (Personal Communication Service) scheme. Recently, third-generation IMT-2000 (International Mobile Telecommunication-2000) scheme which features a high-speed data transfer has been developed and commercialized.

The IMT-2000 scheme is divided into synchronous and asynchronous scheme. The synchronous IMT-2000 scheme is divided again into CDMA (Code Division Multiple Access) 2000 1x scheme and CDMA 2000 1xEV-DO scheme.

The CDMA 2000 1x scheme provides a data transmission service at a peak data rate of 144 kbps, which is much faster than 14.4 kbps or 57.6 kbps supported by existing IS-95A/B network, by using an IS-95C network that has been evolved from the IS-95A/B network. Furthermore, unlike the conventional IS-95A/B network for an exclusive use of a circuit network, the CDMA 2000 1x scheme employs a combination of a circuit network and a packet network. Accordingly, by using the CDMA 2000 1x scheme, the quality of existing voice services and WAP (Wireless Application Protocol) services can be improved and various multimedia services (AOD, VOD, etc.) can be offered.

The CDMA 2000 1xEV-DO scheme is further evolved from the CDMA 2000 1x scheme and is based on a HDR (High Data Rate) concept of Qualcomm Inc., to realize a high-speed packet transmission. The CDMA 2000 1xEV-DO scheme offers an exclusive use of a packet network and a high-speed data service supporting peak data rates of up to 2.4 Mbps on the forward link and up to 153.6 kbps on the reverse link.

However, due to the limit of available bandwidth, all active terminals in a cell cannot receive the data service of 153.6 kbps on the reverse link at the same time. Accordingly, the reverse link resource is managed by allocating a low-speed reverse link extra channel having a data transfer rate lower than 153.6 kbps to the active terminals that are currently communicating or by allocating a high-speed reverse link extra channel of 153.6 kbps to the active terminals by time division.

Recently, there has been proposed various methods to efficiently manage the reverse link resource. Widely employed in the CDMA 2000 1xEV-DO scheme is a method for using the amount of load that is generated by packets normally received from terminals or a method for using a measured rise-over-thermal (ROT) value.

The method for using the load amount involves the steps of measuring the amount of load generated by radio packets normally transmitted from terminals; and, if the load amount is small, increasing a reverse link and, if otherwise, lowering the reverse link rate. The measurement of the load amount is accomplished by using a RRI (reverse rate indicator) transmitted from each terminal in its own cell. Therefore, although a cell self-interference rate is sufficiently reflected, interference rates with other cells are not reflected. Thus, despite the advantage that the amount of load generated by active users who are carrying out communication and the resultant cell self-interference are exactly measured and sufficiently reflected, the method using the load amount cannot perform an accurate control of reverse link rate because it does not reflect the cell interferences with other cells.

Meanwhile, the method using a ROT value involves the steps of measuring a ROT value at each antenna end of a wireless base station and controlling a reverse link rate such that it is increased when the ROT value is small while it is lowered when the ROT value is great. Specifically, the ROT value is obtained by measuring an input signal power of demodulation end at each antenna end of the wireless base station and subtracting a thermal noise power of the mobile communication system from the measured demodulation end input signal power on a decibel (dB) scale. The ROT value is an important value in which a total quantity of received signal power within a radio bandwidth may be reflected. The method using the ROT value is advantageous in that the reverse link rate of terminals can be appropriately controlled because this method reflects cell interference with other cells as well as cell self-interference to thereby measure an overall received load.

Since, however, the cell self-interference or the interference with other cells may include interference components that have substantially no influence on actual call processing of a receiving end, the method using the ROT value have a problem that those interference components are also reflected when the input signal power is measured. As a result, the ROT value tends to be larger than a desired level, so that the terminals are controlled to lower their reverse link rates regardless of the number of active users that are communicating or the amount of load generated by the active users. Such unnecessary control may result in a reduction of a data throughput when a high-speed data processing is required on the reverse link in case of using a visual telephone or a CDMA 2000 1xEV-DO network. Moreover, since the reverse link rates are greatly reduced more than necessary in the environment where instantaneous surge interference components occur, a call drop may be resulted.

Therefore, there is an increasing demand for an inventive method capable of controlling a reverse link rate by way of reflecting only the interference components relevant to the actual call processing, to thereby further improve the quality of data transmission on the reverse link.

DISCLOSURE OF THE INVENTION

It is, therefore, an object of the present invention to provide a method and a system for controlling a reverse link rate in a CDMA 1xEV-DO mobile communication system through the steps of measuring a value of rise-over-thermal (ROT) of the system; determining a reverse activation control bit by using at least one of the measured ROT value, the number of active users that are communicating, and a cell self-interference rate; and transmitting the determined reverse activation control bit to a mobile terminal.

In accordance with a first aspect of the present invention, there is provided a method for controlling a reverse link rate by using the number of active users who are carrying out communication in a CDMA 1xEV-DO mobile communication system, including the steps of: (a) measuring a value of rise-over-thermal (ROT) at each antenna end of a wireless base station to obtain a measured ROT value; (b) comparing the measured ROT value with a threshold ROT which defines an allowable limit of the ROT; (c) setting a reverse activation control bit as 0 to be transmitted to a mobile terminal if the comparison result in step (b) reveals that the measured ROT value is smaller than or equal to the threshold ROT; (d) comparing the number of the active users with a threshold user number which defines an allowable limit of the active users if the comparison result in step (b) reveals that the measured ROT value is greater than the threshold ROT; (e) setting the reverse activation control bit as 0 to be transmitted to the mobile terminal if the comparison result in step (d) reveals that the number of the active users is smaller than or equal to the threshold user number; and (f) setting the reverse activation control bit as 1 to be transmitted to the mobile terminal if the comparison result in step (d) reveals that the number of the active users is greater than the threshold user number.

In accordance with a second aspect of the present invention, there is provided a method for controlling a reverse link rate by using a cell self-interference rate in a CDMA 1xEV-DO mobile communication system, including the steps of: (a) measuring a value of rise-over-thermal (ROT) at each antenna end of a wireless base station to obtain a measured ROT value; (b) comparing the measured ROT value with a threshold ROT which defines an allowable limit of the ROT; (c) setting a reverse activation control bit as 0 to be transmitted to a mobile terminal if the comparison result in step (b) reveals that the measured ROT value is smaller than or equal to the threshold ROT; (d) comparing the cell self-interference rate with a threshold interference rate which defines an allowable limit of the cell self-interference rate if the comparison result in step (b) reveals that the measured ROT value is greater than the threshold ROT; (e) setting the reverse activation control bit as 0 to be transmitted to the mobile terminal if the comparison result in step (d) reveals that the cell self-interference rate is smaller than or equal to the threshold interference rate; and (f) setting the reverse activation control bit as 1 to be transmitted to the mobile terminal if the comparison result in step (d) reveals that the cell self-interference rate is greater than the threshold interference rate.

In accordance with a third aspect of the present invention, there is provided a method for controlling a reverse link rate in a CDMA 1xEV-DO mobile communication system, including the steps of: (a) measuring a value of rise-over-thermal (ROT) at each antenna end of a wireless base station to obtain a measured ROT value; (b) comparing the measured ROT value with a threshold ROT which defines an allowable limit of the ROT; (c) setting a reverse activation control bit as 0 to be transmitted to a mobile terminal if the comparison result in step (b) reveals that the measured ROT value is smaller than or equal to the threshold ROT; (d) comparing the number of active users who are carrying out communication with a threshold user number which defines an allowable limit of the active users or comparing a cell self-interference rate with a threshold interference rate which defines an allowable limit of the cell self-interference rate if the comparison result in step (b) reveals that the measured ROT value is greater than the threshold ROT; (e) setting the reverse activation control bit as 0 to be transmitted to the mobile terminal if the comparison result in step (d) reveals that the number of the active users and the cell self-interference rate are smaller than or equal to the threshold user number and the threshold interference rate, respectively; and (f) setting the reverse activation control bit as 1 to be transmitted to the mobile terminal if the comparison result in step (d) reveals that the number of the active users is greater than the threshold user number or the cell self-interference rate is greater than the threshold interference rate.

In accordance with a fourth aspect of the present invention, there is provided a system for controlling a reverse link rate in a CDMA 1xEV-DO mobile communication system, comprising: at least one mobile terminal capable of transceiving packet data with the reverse link rate changed based on a reverse activation control bit to be received; a radio access network for measuring a value of rise-over-thermal (ROT) of the system to obtain a measured ROT value, determining the reverse activation control bit by using at least one of the measured ROT value, the number of active users who are carrying out communication and a cell self-interference rate and transmitting the reverse activation control bit to control the reverse link rate; and a mobile switching center connected to the radio access network for performing incoming and outgoing call process of the mobile terminal and also connected to be linked with a data communication network.

BRIEF DESCRIPTION OF THE DRAWINGS

The above and other objects and features of the present invention will become apparent from the following description of preferred embodiments given in conjunction with the accompanying drawings, in which.

BEST MODE FOR CARRYING OUT THE INVENTION

Figure 1:
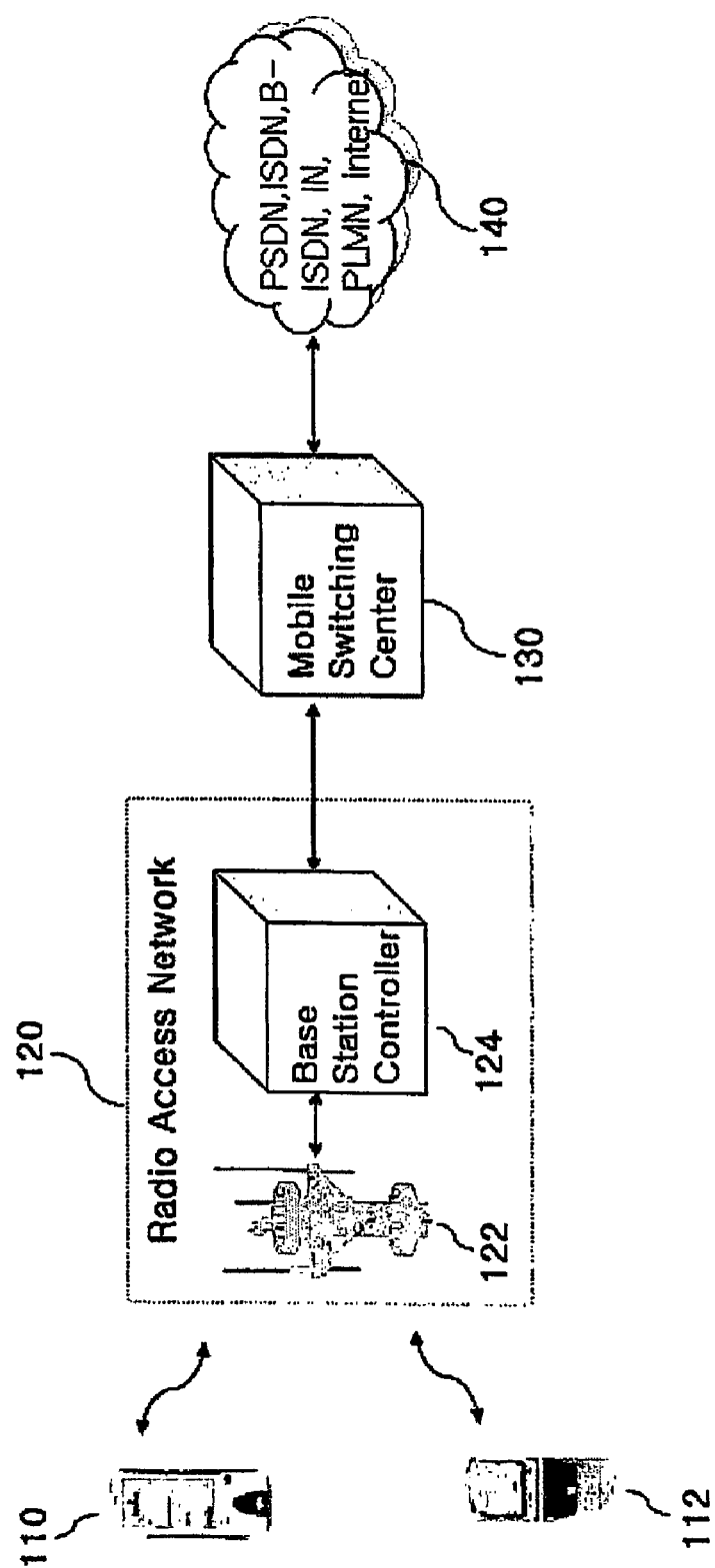
FIG. 1 is a schematic block diagram of a system for controlling a reverse link rate in a CDMA 1xEV-DO mobile communication system in accordance with a preferred embodiment of the present invention.

Hereinafter, preferred embodiments of the present invention will be described in detail with reference to the accompanying drawings. Here, like reference numerals represent like parts in various drawings. Further, it is notable that detailed description of known parts or functions will be omitted if there is a concern that the description of such parts or functions would render the technical essence of the present invention obscure.

Referring to FIG. 1, there is provided a system for controlling a reverse link rate in a CDMA 1xEV-DO mobile communication system in accordance with a preferred embodiment of the present invention.

As shown in FIG. 1, the system includes one or more mobile terminals 110 and 112, a radio access network 120, a mobile switching center 130, a data communication network 140, and so forth.

The mobile terminals 110 and 112 in accordance with the preferred embodiment of the present invention are capable of carrying out transeption (transmission/reception) of packet data and transmit packet data on a time slot basis through a reverse traffic channel via the radio access network 120. Further, the mobile terminals 110 and 112 receive a reverse activation control bit from the radio access network 120 in order to control their reverse link rate and vary their reverse link rate based on the received reverse activation control bit. Here, the reverse activation control bit is defined as a control bit for increasing or decreasing the reverse link rate. For example, upon receiving a reverse activation control bit having a value of 1 from the radio access network 120, the mobile terminals 110 and 112 lower their reverse link rates.

Meanwhile, the mobile terminals in accordance with the preferred embodiment of the present invention include a PDA (Personal Digital Assistant), a cellular phone, a PCS (Personal Communication Service) phone, a hand-held PC, a GSM (Global system for Mobile) phone, a W-CDMA (Wideband CDMA) phone, an EV-DO phone, an EV-DV (Data and Voice) phone and a MBS (mobile Broadband System) phone. The MBS phone refers to a cellular phone to be used in a fourth generation system currently being discussed.

The radio access network (RAN) 120 in accordance with the preferred embodiment of the present invention is a ground infrastructure that serves to exchange data with the mobile terminals 110 and 112 through an air interface, thereby allowing the mobile terminals 110 and 112 to communicate on the move. Specifically, the RAN 120 carries out handoff, radio resource management, and so forth. The RAN 120 includes a wireless base station 122 and a base station controller 124. The RAN 120 serves to control a reverse link rate through the series of processes of calculating a ROT value of the mobile communication system, determining a reverse activation control bit by using at least one of the measured ROT value, the number of users who are carrying out communication and a cell self-interference rate, and sending the determined reverse activation control bit to the mobile terminals 110 and 112.

Here, a ROT value is obtained by measuring an input signal power of demodulation end at each antenna end of the wireless base station 122 and subtracting a thermal noise power of the mobile communication system from the measured demodulation end input signal power on a decibel (dB) scale. The ROT value is an important value in which a total quantity of received signal power within a radio bandwidth may be reflected. Since the thermal noise power is a power of the mobile communication system itself, it should be measured at a state where reverse transmissions of the mobile terminals 110 and 112 are temporarily ceased. Further, the ROT value for use in controlling the reverse link rate is defined as a largest value among differences between input signal powers measured at each antenna end of the wireless base station 122 and the thermal noise power of the system.

Meanwhile, the cell self-interference rate is measured by using an amount of load generated by packets normally received from the mobile terminals 110 and 112, the load amount being calculated by using reverse link rate identifier (RRI) which is transmitted to the RAN 120 from the mobile terminals 110 and 112.

The wireless base station 122 serves as a network endpoint apparatus which is directly linked with the mobile terminals 110 and 112 by way of carrying out baseband signal processing, fixed radio substitution, transception of radio signals, and so forth. The base station controller 124 controls the wireless base station 122 while performing various functions which include allocation and release of a radio channel with respect to the mobile terminals 110 and 112, control of transmission power of the mobile terminals 110 and 112 and the wireless base station 122, determination of soft handoff or hard handoff between cells, transcoding and vocoding, distribution of GPS (global positioning system) clocks, management and maintenance of the wireless base station 122, and so forth. In the meantime, the control of the reverse link rate described above may be carried out in the wireless base station 122 or the base station controller 124 of the radio access network 120.

The mobile switching center 130 in accordance with the preferred embodiment of the present invention is connected to the RAN 120 to perform an incoming and an outgoing call process of the mobile terminals 110 and 112 and be linked with the data communication network 140. The data communication network 140 may be a PSDN (Public Switched Data Network), an ISDN (Integrated Services Digital Network), a B-ISDN (Broadband ISDN), an IN (Intelligent Network), a PLMN (Public Land Mobile Network), Internet, and so forth.

Figure 2:
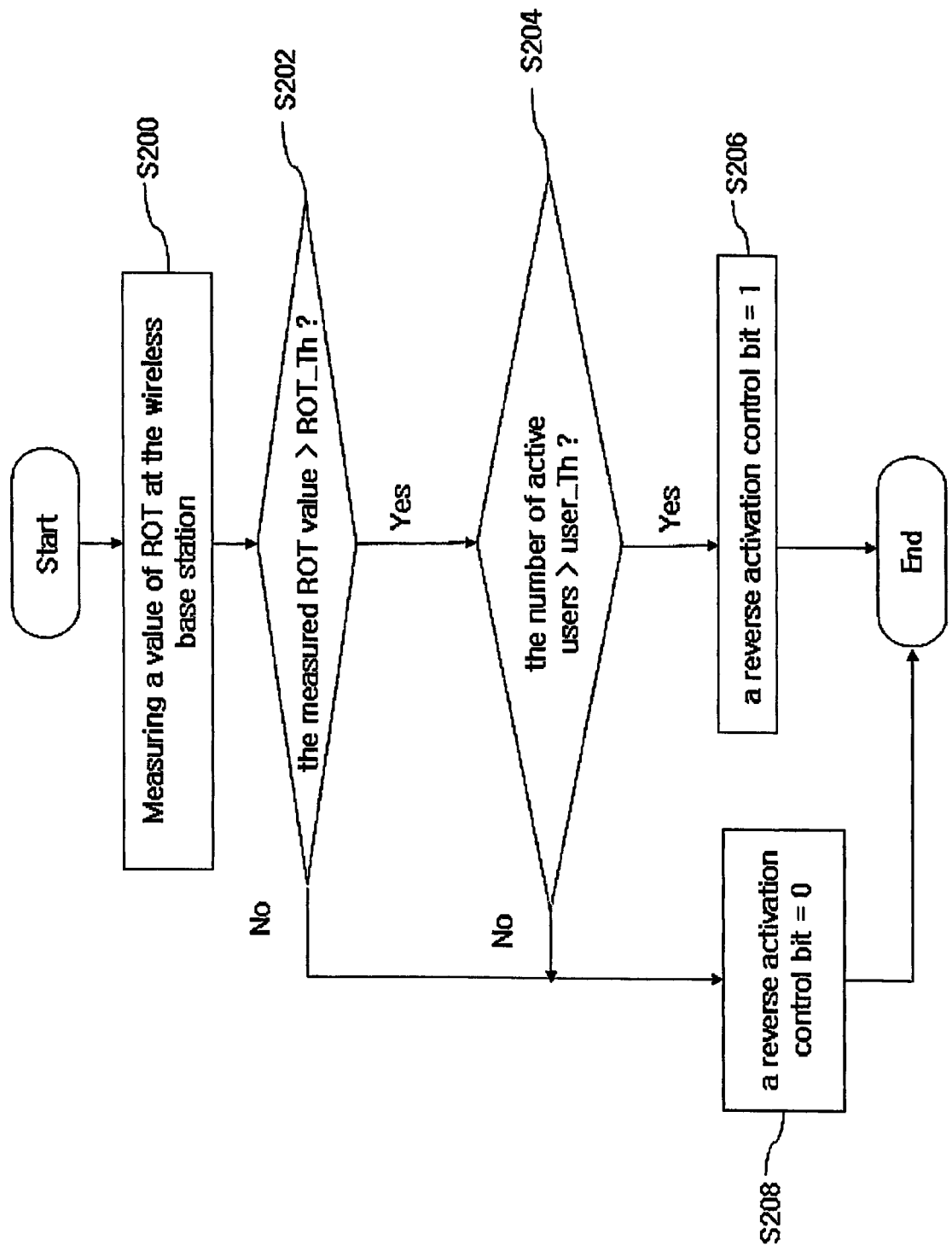
FIG. 2 shows a flowchart describing a method for controlling a reverse link rate in a CDMA 1xEV-DO mobile communication system in accordance with a first preferred embodiment of the present invention.

FIG. 2 presents a flow chart describing a method for controlling a reverse link rate in a CDMA 1xEV-DO mobile communication system in accordance with a first preferred embodiment of the present invention.

First, a value of ROT is measured at the wireless base station 122 (S200). A ROT value is obtained by measuring an input signal power of demodulation end at each antenna end of the wireless base station 122 and subtracting a thermal noise power of the mobile communication system itself from the demodulation end input signal power on a decibel (dB) scale. In the first embodiment, the ROT value for use in controlling the reverse link rate is a largest value among differences between input signal powers measured at each antenna end of the wireless base station 122 and the thermal noise power of the communication system.

Next, the measured ROT value is compared with a threshold ROT value (ROT_Th), which represents an allowable limit of the ROT value (S202). If the measured ROT value is found to be equal to or smaller than the ROT_Th in step S202, a reverse activation control bit is set to have a value of 0 and transmitted to the mobile terminals 110 and 112 (S208). If the measured ROT value is small, it implies that a system load with regard to the reverse link is still at a permissible level and, therefore, the reverse activation control bit is set as 0 so that the current reverse link rate may be maintained.

In the meantime, if the measured ROT value is found to be greater than the ROT_Th in step S202, the number of active users who are carrying out communication is compared with a threshold user number (user_Th), which indicates an allowable limit of the active users (S204).

If it is determined in step S204 that the number of the active users is smaller than or equal to the user_Th, a reverse activation control bit having a value of 0 is transmitted to the mobile terminals 110 and 112 (S208). If the number of the active users is small, it implies that the high level of the measured ROT value has resulted from an interference component which substantially has little influence on an actual call processing and, therefore, the reverse activation control bit is set to be 0 to maintain the current reverse link rate. If the number of the active users is not be considered when the measured ROT value is found to be great, the reverse activation control bit would be set to have a value of 1 even if the number of the active users is not great, resulting in an unnecessary reduction in the reverse link rate. Meanwhile, if the comparison result in step S204 reveals that the number of the current active users is greater than the user_Th in step S204, the reverse activation control bit would be set to have a value of 1 and is transmitted to the mobile terminals 110 and 112 (S206). Upon receiving the reverse activation control bit having the value of 1, the mobile terminals 110 and 112 lower their reverse link rates.

In the first embodiment, the ROT_Th representing an allowable limit of the ROT is set to be 1000 while the user_Th representing an allowable limit of the active users is set to have a value of 4. These threshold values are constant values but may be varied depending on the environment of the mobile communication system.

As described, the reverse link rate is controlled by considering the number of the current active users as well as the ROT value measured at the wireless base station 122 in accordance with the first embodiment of the present invention so that, in comparison with the conventional method only using a ROT value, more flexible control of reverse link rate can be realized.

Figure 3:
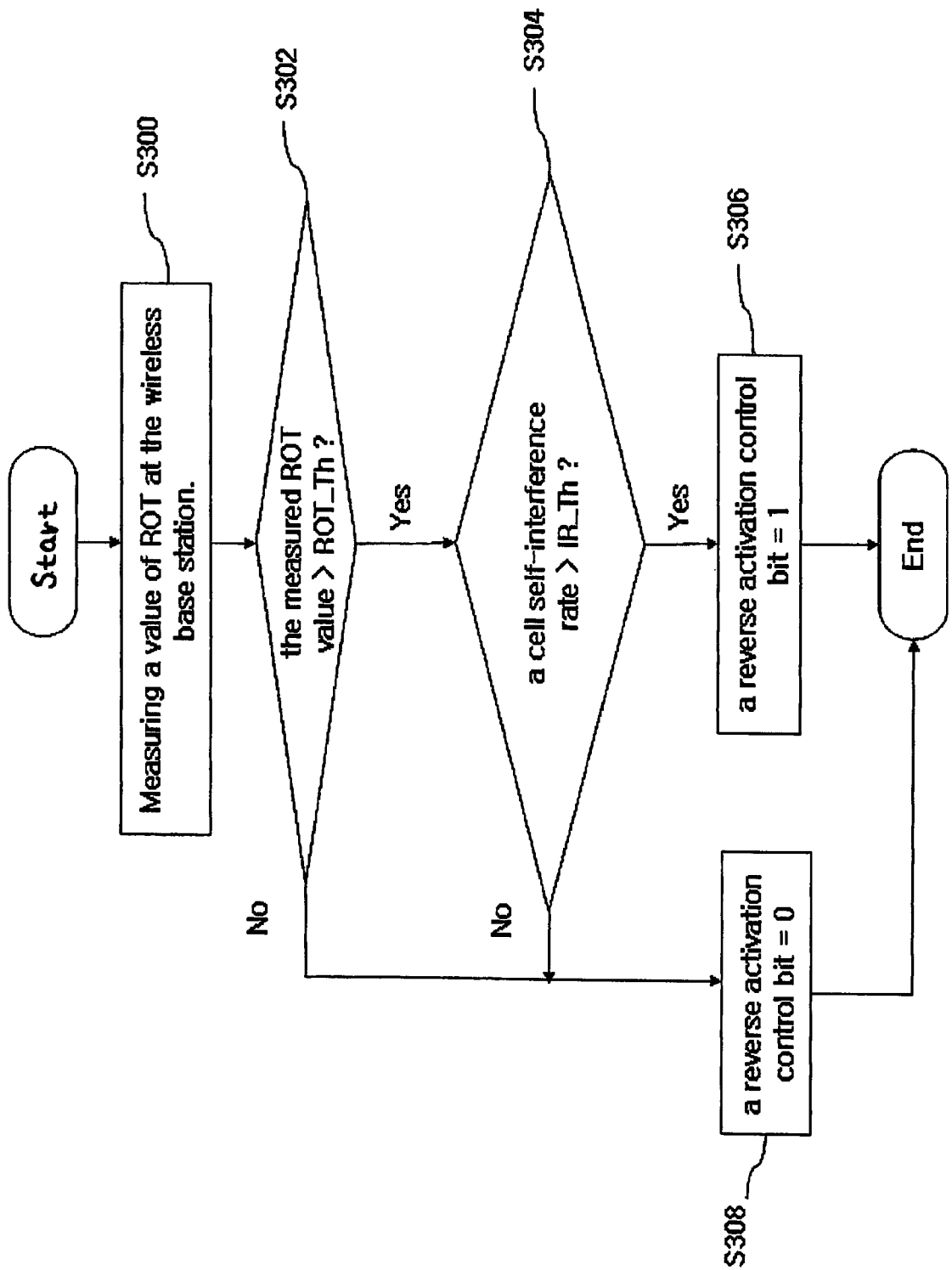
FIG. 3 presents a flowchart describing a method for controlling a reverse link rate in a CDMA 1xEV-DO mobile communication system in accordance with a second preferred embodiment of the present invention.

Referring to FIG. 3, there is provided a flow chart describing a method for controlling a reverse link rate in a CDMA 1xEV-DO mobile communication system in accordance with a second preferred embodiment of the present invention.

The second embodiment is similar to the first embodiment in its overall mechanism, and, thus, description of parts or functions identical to those described in the first embodiment will be omitted.

First, a ROT value is measured at the wireless base station 122 (S300) and, then, the measured ROT value is compared with a ROT_Th (Threshold), which represents an allowable limit of the ROT (Step S302).

If the measured ROT value is found to be smaller than or equal to the ROT_Th in step S302, a reverse activation control bit is set to have a value of 0 and transmitted to the mobile terminals 110 and 112. In the mean time, if the comparison result in step S302 shows that the measured ROT value is greater than the ROT_Th, comparison of a cell self-interference rate (IR) with a threshold cell self-interference rate (IR_Th) is carried out (S304), wherein the cell self-interference rate represents the amount of load generated by current active users who are carrying out communication while the IR_Th indicates an allowable limit of the cell self-interference rate. Specifically, the cell self-interference rate is obtained by using the amount of load generated by packets normally received from the mobile terminals 110 and 112, wherein the value of the load amount equals to that measured in the above-described method for controlling the reverse link rate by using an amount of load.

If it is determined in step S304 that the cell self-interference rate is greater than the IR_Th, a reverse activation control bit is set to have a value of 0 and transmitted to the mobile terminals 110 and 112 (S308). If the cell self-interference rate is small, it implies that the high level of the measured ROT value has resulted from an interference component which substantially has little influence on an actual call processing so that the reverse activation control bit is set as 0 to maintain the current reverse link rate. If the cell self-interference rate is not considered when the measured ROT value is found to be. great, the reverse activation control bit would be set to have a value of 1 even if the increase of ROT has merely resulted from a high level of the interference components with other cells or instantaneous increase of noises of single tone type in its own cell. In this case, if a transmission signal (Tx_adj) or a ratio of carrier to interference (C/I) is further considered, it is frequently found that reduction of the reverse link rate is not required in most of such cases. Therefore, by considering the cell self-interference rate and the ROT value together, the reverse link rate is prevented from being lowered more than required in those cases.

Meanwhile, if the comparison result in step S304 reveals that the cell self-interference rate is greater than the IR_Th, the reverse activation control bit is set to have a value of 1 and transmitted to the mobile terminals 110 and 112 (S306). Upon receiving the reverse activation control bit having the value of 1, the mobile terminals 110 and 112 lower their reverse link rates.

In the second embodiment, the ROT_Th representing an allowable limit of the ROT is set to be 1000 while the IR_Th representing an allowable limit of the cell self-interference rate is set to be 15%. These threshold values are constant values but may be varied depending on the environment of the mobile communication system.

As described, the reverse link rate is controlled by considering the cell self-interference rate as well as the ROT value measured at the wireless base station 122 in accordance with the second embodiment of the present invention so that, in comparison with the conventional method only using a ROT value, more flexible control of reverse link rate can be realized.

Figure 4:
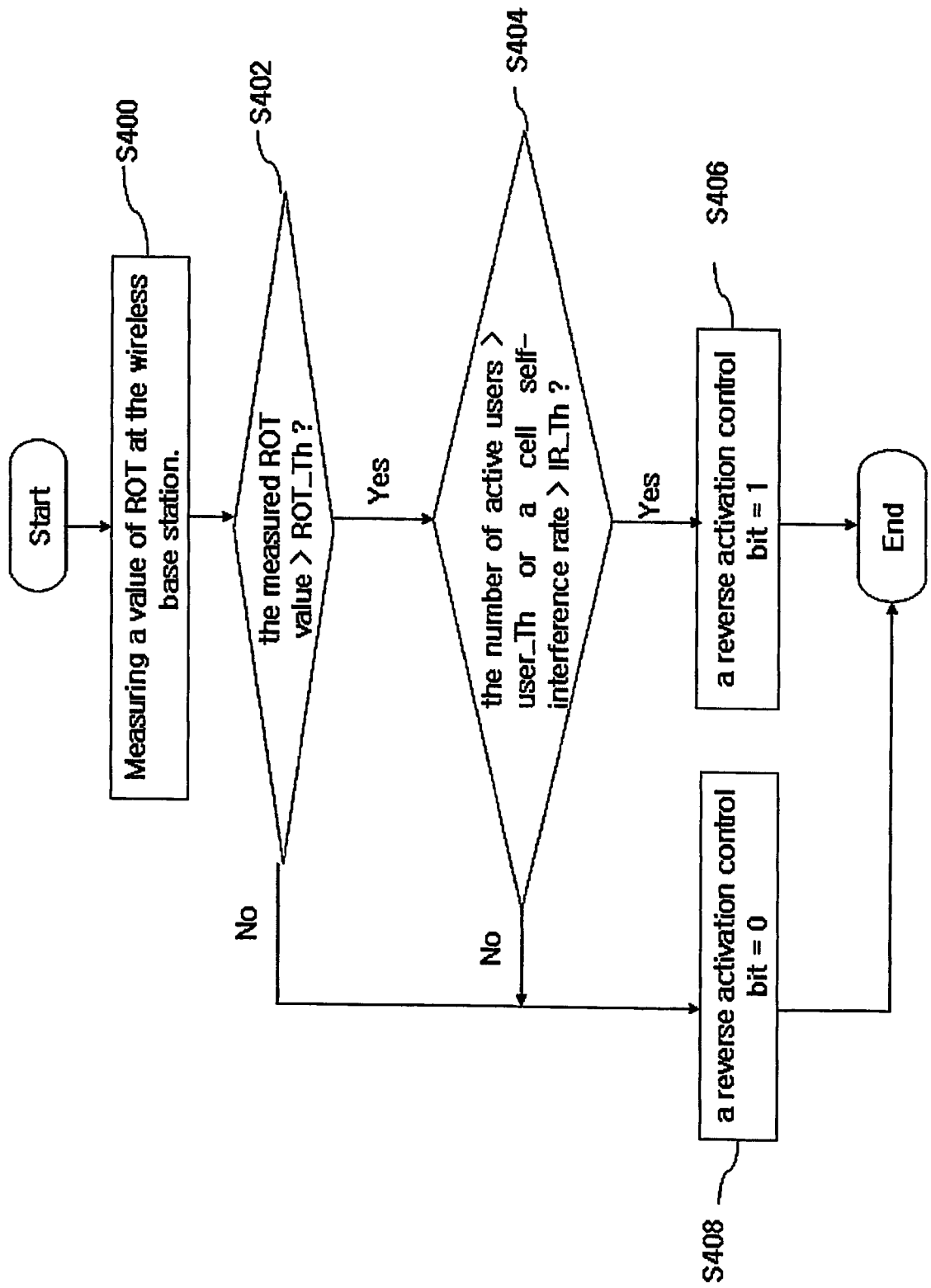
FIG. 4 sets forth a flowchart describing a method for controlling a reverse link rate in a CDMA 1xEV-DO mobile communication system in accordance with a third preferred embodiment of the present invention.

Referring to FIG. 4, there is provided a flow chart describing a method for controlling a reverse link rate in a CDMA 1xEV-DO mobile communication system in accordance with a third preferred embodiment of the present invention.

The third embodiment is similar to the first or the second embodiment in its overall mechanism, and, thus, description of parts or functions identical to those described in the first or the second embodiment will be omitted.

First, a ROT value is measured at the wireless base station 122 (S400) and, then, the measured ROT value is compared with a threshold ROT value (ROT_Th), which represents an allowable limit of the ROT (Step S402).

If the measured ROT value is found to be smaller than or equal to the ROT_Th in step S402, a reverse activation control bit is set to have a value of 0 and transmitted to the mobile terminals 110 and 112 (S408).

If the comparison result in step S402 shows that the measured ROT value is greater than the ROT_Th, on the other hand, the number of current active users is compared with a threshold user number (user_Th) or a cell self-interference rate is compared with a threshold interference rate (IR_Th) (S404), wherein the user_Th represents an allowable limit of the active users who are communicating, the cell self-interference rate is an amount of loads generated by the active users and the IR_Th represents an allowable limit of the cell self-interference rate.

If it is determined in step S404 that the number of the current active users is smaller than the user_Th and the cell self-interference rate is smaller than the IR_Th, a reverse activation control bit is set as 0 and transmitted to the mobile terminals 110 and 112 (S408).

Meanwhile, if the comparison result in step S404 reveals that either the number of the active user is greater than the user_Th or the cell self-interference rate is greater than the IR_Th, the reverse activation control bit is set to have a value of 1 and transmitted to the mobile terminals 110 and 112 (S306). Upon receiving the reverse activation control bit having the value of 1, the mobile terminals 110 and 112 lower their reverse link rates.

In the third embodiment, the ROT_Th representing an allowable limit of the ROT, the user_Th representing an allowable limit of the active users, and the IR_Th representing an allowable limit of the cell self-interference rate are set to be 1000, 4 and 15%, respectively. These threshold values are constant values that can be varied depending on the system environment. As described, the reverse link rate is controlled by considering the number of the active users who are communicating and the cell self-interference rate as well as the ROT value measured at the wireless base station 122 in accordance with the third embodiment of the present invention. Therefore, in comparison with the conventional method only using a ROT value, more flexible control of reverse link rate can be realized.

Industrial Applicability

In accordance with the present invention described above, by properly using the number of active uses who are carrying out communication and the rate of own cell interferences generated by the active users as well as a ROT value of the mobile communication system in controlling a reverse link rate, the reverse link rate can be prevented from being lowered more than necessary, thereby improving the quality of the reverse link. That is, by combining the merits of a reverse link rate control method using a ROT and a reverse link rate control method using a load amount, the quality of the reverse link can be greatly improved. While the invention has been shown and described with respect to the preferred embodiments, it will be understood by those skilled in the art that various changes and modifications may be made without departing from the spirit and scope of the present invention as defined in the following claims.

The invention claimed is:

1. A method for controlling a reverse link rate by using the number of active users who are carrying out communication in a CDMA 1xEV-DO mobile communication system, comprising the steps of:
    (a) measuring a value of rise-over-thermal (ROT) at each antenna end of a wireless base station to obtain a measured ROT value;
    (b) comparing the measured ROT value with a threshold ROT which defines an allowable limit of the ROT;
    (c) setting a reverse activation control bit as 0 to be transmitted to a mobile terminal if the comparison result in step (b) reveals that the measured ROT value is smaller than or equal to the threshold ROT;
    (d) comparing the number of the active users with a threshold user number which defines an allowable limit of the active users if the comparison result in step (b) reveals that the measured ROT value is greater than the threshold ROT;
    (e) setting the reverse activation control bit as 0 to be transmitted to the mobile terminal if the comparison result in step (d) reveals that the number of the active users is smaller than or equal to the threshold user number; and
    (f) setting the reverse activation control bit as 1 to be transmitted to the mobile terminal if the comparison result in step (d) reveals that the number of the active users is greater than the threshold user number.

2. The method of claim 1, wherein the ROT value is obtained by subtracting a thermal noise power of the system from a received power measured at said each antenna end.

3. The method of claim 2, wherein the thermal noise power is measured at a state where a reverse transmission of the mobile terminal is ceased.

4. The method of claim 1, wherein the measured ROT value is a largest value among ROT values measured at said each antenna end of the wireless base station.

5. The method of claim 1, wherein the mobile terminal lowers the reverse link rate if the reverse activation control bit with a value of 1 is transmitted in step (f).

6. The method of claim 1, wherein the mobile terminal includes a PDA (Personal Digital Assistant), a cellular phone, a PCS (Personal Communication Service) phone, a hand-held PC, a GSM (Global System for Mobile) phone, a W-CDMA (Wideband CDMA) phone, an EV-DO phone, an EV-DV (Data and Voice) phone and a MBS (mobile Broadband System) phone.

7. The method of claim 1, wherein the mobile terminal transmits packet data to the wireless base station on a time slot basis through a reverse traffic channel.

8. The method of claim 1, wherein the threshold ROT is 1000.

9. The method of claim 1, wherein the threshold user number is 4.

10. A method for controlling a reverse link rate by using a cell self-interference rate in a CDMA 1xEV-DO mobile communication system, comprising the steps of:
    (a) measuring a value of rise-over-thermal (ROT) at each antenna end of a wireless base station to obtain a measured ROT value;
    (b) comparing the measured ROT value with a threshold ROT which defines an allowable limit of the ROT;
    (c) setting a reverse activation control bit as 0 to be transmitted to a mobile terminal if the comparison result in step (b) reveals that the measured ROT value is smaller than or equal to the threshold ROT;
    (d) comparing the cell self-interference rate with a threshold interference rate which defines an allowable limit of the cell self-interference rate if the comparison result in step (b) reveals that the measured ROT value is greater than the threshold ROT;
    (e) setting the reverse activation control bit as 0 to be transmitted to the mobile terminal if the comparison result in step (d) reveals that the cell self-interference rate is smaller than or equal to the threshold interference rate;
    (f) setting the reverse activation control bit as 1 to be transmitted to the mobile terminal if the comparison result in step (d) reveals that the cell self-interference rate is greater than the threshold interference rate; and
    (g) setting the reverse activation control bit as 1 to be transmitted to the mobile terminal if a number of the active users is greater than a threshold user number.

11. The method of claim 10, wherein the ROT value is obtained by subtracting a thermal noise power of the system from a received power measured at said each antenna end.

12. The method of claim 11, wherein the thermal noise power is measured at a state where a reverse transmission of the mobile terminal is ceased.

13. The method of claim 10, wherein the measured ROT value is a largest value among ROT values measured at said each antenna end of the wireless base station.

14. The method of claim 10, wherein the cell self-interference rate is obtained by using an amount of load generated by packets normally received from the mobile terminal.

15. The method of claim 10, wherein the mobile terminal lowers the reverse link rate if the reverse activation control bit with a value of 1 is transmitted in step (f).

16. The method of claim 10, wherein the mobile terminal includes a PDA (Personal Digital Assistant), a cellular phone, a PCS (Personal Communication Service) phone, a hand-held PC, a GSM (Global System for Mobile) phone, a W-CDMA (Wideband CDMA) phone, an EV-DO phone, an EV-DV (Data and Voice) phone and a MBS (mobile Broadband System) phone.

17. The method of claim 10, wherein the mobile terminal transmits packet data to the wireless base station on a time slot basis through a reverse traffic channel.

18. The method of claim 10, wherein the threshold ROT is 1000.

19. The method of claim 10, wherein the threshold interference rate is 15%.

20. A method for controlling a reverse link rate in a CDMA 1xEV-DO mobile communication system, comprising the steps of:
(a) measuring a value of rise-over-thermal (ROT) at each antenna end of a wireless base station to obtain a measured ROT value;
(b) comparing the measured ROT value with a threshold ROT which defines an allowable limit of the ROT;
(c) setting a reverse activation control bit as 0 to be transmitted to a mobile terminal if the comparison result in step (b) reveals that the measured ROT value is smaller than or equal to the threshold ROT;
(d) comparing the number of active users who are carrying out communication with a threshold user number which defines an allowable limit of the active users and comparing a cell self-interference rate with a threshold interference rate which defines an allowable limit of the cell self-interference rate if the comparison result in step (b) reveals that the measured ROT value is greater than the threshold ROT;
(e) setting the reverse activation control bit as 0 to be transmitted to the mobile terminal if the comparison result in step (d) reveals that the number of the active users and the cell self-interference rate are smaller than or equal to the threshold user number and the threshold interference rate, respectively; and
(f) setting the reverse activation control bit as 1 to be transmitted to the mobile terminal if the comparison result in step (d) reveals that the number of the active users is greater than the threshold user number or the cell self-interference rate is greater than the threshold interference rate.

21. The method of claim 20, wherein the ROT value is obtained by subtracting a thermal noise power of the system from a received power measured at said each antenna end.

22. The method of claim 21, wherein the thermal noise power is measured at a state where a reverse transmission of the mobile terminal is ceased.

23. The method of claim 20, wherein the measured ROT value is a largest value among ROT values measured at said each antenna end of the wireless base station.

24. The method of claim 20, wherein the cell self-interference rate is obtained by using an amount of load generated by packets normally received from the mobile terminal.

25. The method of claim 20, wherein the mobile terminal lowers the reverse link rate if the reverse activation control bit with a value of 1 is transmitted in step (f).

26. The method of claim 20, wherein the mobile terminal includes a PDA (Personal Digital Assistant), a cellular phone, a PCS (Personal Communication Service) phone, a hand-held PC, a GSM (Global System for Mobile) phone, a W-CDMA (Wideband CDMA) phone, an EV-DO phone, an EV-DV (Data and Voice) phone and a MBS (mobile Broadband System) phone.

27. The method of claim 20, wherein the mobile terminal transmits packet data to the wireless base station on a time slot basis through a reverse traffic channel.

28. The method of claim 20, wherein the threshold ROT is 1000.

29. The method of claim 20, wherein the threshold user number is 4.

30. The method of claim 20, wherein the threshold interference rate is 15%.

31. A system for controlling a reverse link rate in a CDMA 1xEV-DO mobile communication system, comprising:
at least one mobile terminal capable of transceiving packet data with the reverse link rate changed based on a reverse activation control bit to be received;
a radio access network for measuring a value of rise-over-thermal (ROT) of the system to obtain a measured ROT value, determining the reverse activation control bit by using at least one of the measured ROT value, the number of active users who are carrying out communication and a cell self-interference rate and transmitting the reverse activation control bit to control the reverse link rate; and
a mobile switching center connected to the radio access network for performing incoming and outgoing call process of the mobile terminal and also connected to be linked with a data communication network;
wherein the reverse activation control bit is set to have a value of 0 if the measured ROT value is greater than a threshold ROT which represents an allowable limit of the ROT but the number of the active users and the cell self-interference rate are smaller than or equal to a threshold user number which represents an allowable limit of the active user and a threshold interference rate which represents an allowable limit of the cell self-interference rate, respectively.

32. The system of claim 31, wherein the reverse activation control bit is set to have a value of 0 if the measured ROT value is smaller than or equal to a threshold ROT which represents an allowable limit of the ROT.

33. The system of claim 31, wherein the reverse activation control bit is set to have a value of 1 if the measured ROT value is greater than a threshold ROT which represents an allowable limit of the ROT and if the number of the active users is greater than a threshold user number which represents an allowable limit of the active users or the cell self-interference rate is greater than a threshold interference rate which represents an allowable limit of the cell self-interference rate.

34. The system of claim 31, wherein the mobile terminal lowers the reverse link rate if the reverse activation control bit with a value of 1 is transmitted.

35. The system of claim 31, wherein the mobile terminal includes a PDA (Personal Digital Assistant), a cellular phone, a PCS (Personal Communication Service) phone, a hand-held PC, a GSM (Global System for Mobile) phone, a W-CDMA (Wideband CDMA) phone, an EV-DO phone, an EV-DV (Data and Voice) phone and a MBS (mobile Broadband System) phone.

36. The system of claim 31, wherein the mobile terminal transmits packet data to the radio access network on a time slot basis through a reverse traffic channel.

37. The system of claim 31, wherein the data communication network includes a PSDN (Public Switched Data Network), an ISDN (Integrated Services Digital Network), a B-ISDN (Broad ISDN), an IN (Intelligent Network), a PLMN (Public Land Mobile Network) and Internet.

38. The system of claim 31, wherein the ROT value is obtained by subtracting a thermal noise power of the system from a received power measured at each antenna end of a wireless base station.

39. The system of claim 38, wherein the thermal noise power is measured at a state where a reverse transmission of the mobile terminal is ceased.

40. The system of claim 31, wherein the measured ROT value is a largest value among ROT values measured at each antenna end of a wireless base station.

41. The system of claim 31, wherein the cell self-interference rate is obtained by using an amount of load generated by packets normally received from the mobile terminal.

42. The system of claim 32, wherein the threshold ROT is 1000.

43. The system of claim 32, wherein the threshold user number is 4.

44. The system of claim 31, wherein the threshold interference rate is 15%.

* * * * *